United States Patent [19]

Gerhard

[11] Patent Number: 4,813,832
[45] Date of Patent: Mar. 21, 1989

[54] FIXING ELEMENT KEYABLE IN A HOLE IN A SOLID BASE

[76] Inventor: Anton Gerhard, Illesheimer Strasse 10, D-8500 Nürnberg 80, Fed. Rep. of Germany

[21] Appl. No.: 64,291

[22] Filed: Jun. 17, 1987

[51] Int. Cl.[4] ............................................. F16B 13/04
[52] U.S. Cl. .................................. 411/78; 411/80; 411/448
[58] Field of Search ............ 411/45, 47, 75, 78, 411/79, 80, 389, 447, 448

[56] References Cited

U.S. PATENT DOCUMENTS

| | | | |
|---|---|---|---|
| 4,275,637 | 6/1981 | Herb et al. | 411/79 |
| 4,312,611 | 1/1982 | Herb | 411/79 |
| 4,312,615 | 1/1982 | Herb | 411/78 |
| 4,636,125 | 1/1987 | Burgard | 411/389 |

FOREIGN PATENT DOCUMENTS 2507658 9/1976 Fed. Rep. of Germany .

Primary Examiner—Neill R. Wilson
Attorney, Agent, or Firm—Browdy & Neimark

[57] ABSTRACT

A fixing element which can be keyed in a hole in a solid base has a tie bolt and a key which is movably mounted on a key surface slanting relative to the central longitudinal axis of the tie bolt. There is furthermore provided a power store which is supported on the one hand against an abutment of the tie bolt, and, on the other hand exerts a pressure force onto the key. Provided also is a ring which holds together the tie bolt and the key. In order to ensure with such a fixing element a simple construction and simple possibilities of assembly for a short distance from the base, the power store applies constantly against the key, the inelastic ring in a position in the region of the key surface of the tie bolt clamps the tie bolt and the key against each other under the pressure force of the power store, and the ring in a position behind the key surface holds the key freely movable in longitudinal direction relative to the tie bolt.

9 Claims, 3 Drawing Sheets

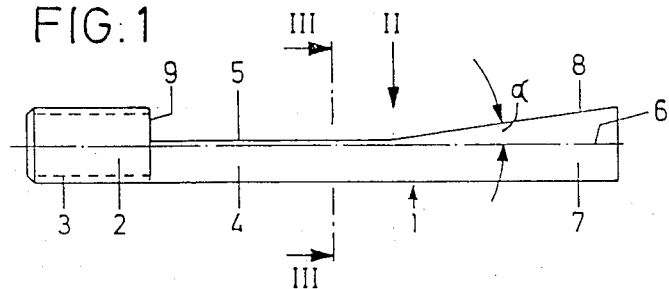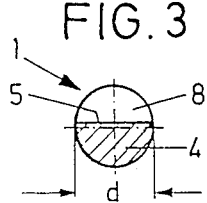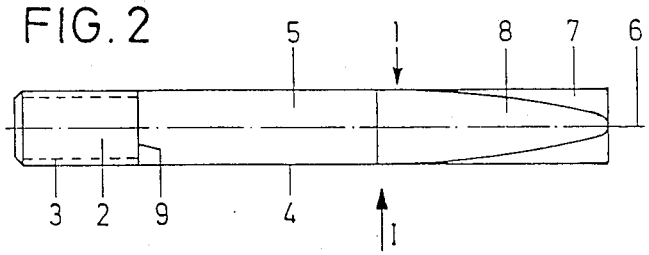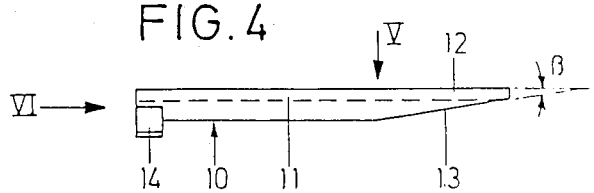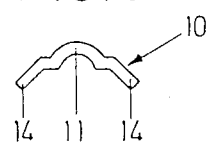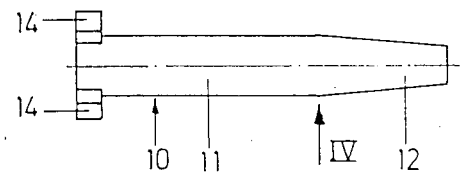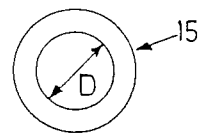

FIXING ELEMENT KEYABLE IN A HOLE IN A SOLID BASE

FIELD OF THE INVENTION

The invention relates to a fixing element which can be keyed in a hole in a solid base having a tie bolt and a key which is movably mounted on a key surface slanting relative to the central longitudinal axis of the tie bolt. There is furthermore provided a power store which is supported against an abutment of the tie bolt, and which exerts a pressure force onto the key. Provided also is a ring which holds together the tie bolt and the key.

BACKGROUND OF THE INVENTION

In such a fixing element known from DE-OS No. 25 07 658, the tie bolt and the key are held together by means of a plastic ring, the sole task of which is to secure the key against loss or to hold it in a hole in the correct position relative to the tie bolt for the start of an assembly. The pressure spring acting as a power store lies against two lugs formed on a long external area of the tie bolt, and applies against a slider engaged in the tie bolt. After the tie bolt has been pushed in, with key in a hole, this slider acting as a catch is moved out of its bolting position transversely to the tie bolt, as a result of which the spring can be released, and drives the key into the hole, as it takes the catch along. This fixing element is used for insertion in concrete and hard tiles and fits very reliably and solidly with high extraction rates in corresponding holes. Drawbacks are the relatively complicated construction and assembly in a hole requiring several grips. Furthermore, it is felt to be a drawback that the fixing element juts out relatively far from the hole.

SUMMARY OF THE INVENTION

An object of the invention is to provide a fixing element of the type described above, which is of simple construction and easily assembled, and protrudes out of the hole to the minimum extent.

This object is achieved according to the invention by the following features: The power store applies constantly against the key. The inelastic ring clamps the tie bolt and the key against each other under the pressure force of the power store, when the ring is in a position in the region of the key surface. The ring holds the key freely movable in longitudinal direction relative to the tie bolt, when the ring is in a position behind the key surface.

A nucleus of the invention is the ring acting as a catch which, in its position in the vicinity of the end of the tie bolt to be pushed into the hole, on account of the permanent pressure of the power store against the key, not only secures the latter radially against a falling down of the tie bolt, but also holds the key in a definite axial position relative to the tie bolt, in which position the overall diameter of key and tie bolt is somewhat smaller than the diameter of the hole. On the insertion of the tie bolt with wedge into the hole, the ring applies against the side of the hole and is pushed back relative to the tie bolt and key. Thereby the key is continuously released, but is moved by the pressure store in the insertion direction relative to the tie bolt only to the extent permitted by the diameter of the hole. When the key comes to rest with its front end against the wall of the hole, it is firmly held there and, as insertion forces are exerted only against the tie bolt, it is again pushed back slightly relative to the tie bolt. Thus equilibrium is constantly established between the pressure force of the pressure store and the opposite force exerted by the wall of the hole. In this manner, with a single hand movement, the tie bolt and key can be pushed over the entire length into the hole. Then, under the pressure of the power store, the key can spread so far that key and tie bolt apply firmly against the wall of the hole. A slight pulling movement on the tie bolt then leads to a setting of the fixing element, i.e. it is rigidly keyed in the hole. Test have shown that the so-called extraction values, i.e. the force required to pull the fixing element out of a hole, are so great that with use in concrete the tie bolt tears. If a tear develops in the ground below, so that the hole increases its diameter slightly, the key is pushed back by the power store and fastens itself again.

Further advantages and features of the invention will be obvious from the description of an illustrative embodiment with reference to the drawing.

BRIEF DESCRIPTION OF THE DRAWING

FIG. 1 shows a tie bolt in side view corresponding to the arrow I in FIG. 2;

FIG. 2 shows a top view of the tie bolt along the arrow II in FIG. 1;

FIG. 3 shows a cross-section through the tie bolt according to line III—III in FIG. 1;

FIG. 4 shows a key in side view along arrow IV in FIG. 5;

FIG. 5 shows the key in top view along arrow V in FIG. 4;

FIG. 6 is a front view of the key along arrow IV in FIG. 4;

FIG. 7 is a front view of a catch constructed as a ring;

DETAILED DESCRIPTION OF EMBODIMENT

Figure 8:
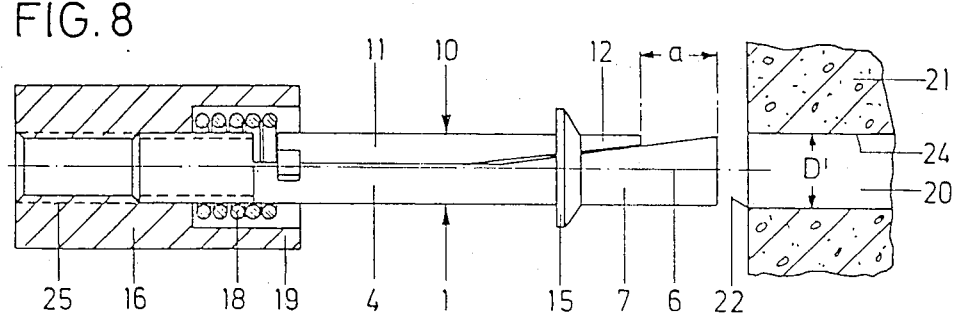
FIG. 8 is an assembled fixing element before introduction into a hole.

The fixing element shown on the drawing has a tie bolt 1 which is provided at one end with a cylindrical threaded portion 2 with an outer thread 3.

Following the threaded section 2, the tie bolt has a segment-shaped portion 4 which is a portion with segment-shaped cross-section, with the level surface 5 adjacent to the corresponding recess extending parallel with the central longitudinal axis 6 of the tie bolt 1. The segment-shaped portion 4 fills rather more than a semicylindrical profile.

Joining on to the segment-shaped portion 4 is a key portion 7 which has a lever key surface 8 slanting with respect to the central longitudinal axis 6 or the level surface 5. This key surface 8 runs out at the end of the tie bolt 1 substantially along the circumference of the tie bolt 1, as shown in FIGS. 2 and 3. The angle of slant α between the key surface 8 and the central longitudinal axis 6 is about 5° to 8° and preferably 7°. At the transition from the threaded portion 2 to the segment-shaped portion 4 a stop face 9 is provided extending radially with respect to the axis 6.

Furthermore a key 10 is provided which is somewhat shorter than the overall length of the segment-shaped portion 4 and the key portion 7 of the tie bolt 1. The key 10 has a segment-shaped portion 11, which is somewhat shorter than the segment-shaped portion 4. It has furthermore a wedge-shaped portion 12 which is somewhat shorter than the key portion 7 of the tie bolt 1. The segment-shaped portion 11 and the segment portion 4 extend into a circle, i.e. the outer cross-section of the segment-shaped portion 11 is somewhat smaller than semi-circular.

The key 10 has in its wedge-shaped portion 12 a guide surface 13, which slants with respect to the generating lines of the key 10 by an angle $\beta$ which is slightly smaller than the angle of slant $\alpha$. For example it could be about 1° smaller.

The key 10 may have a hollow cross-section, so that it may be made e.g. of sheet metal. It has at the free end of the segment-shaped portion 11 two laterally protruding projections 14.

Furthermore, there is provided as a catch an inelastic metal ring 15 the inner diameter D of which is about 0.1 mm greater than the diameter d of the tie bolt 1.

If the key 10 lies on the tie bolt 1 in such a manner that the segment-shaped portion 11 applies against the stop face 9 the ring 15 can be pushed away from the key portion 7 onto the tie bolt 1. It is pushed over the tie bolt 1 only to the extent that it covers precisely the wedge-shaped portion 12 of the key 10. If the key 10 is then pushed slightly in the direction of the key portion 7 it will then, as a consequence of the radial displacement of the guide surface 13 on the key surface 8, be lifted radially from the tie bolt 1 and become clamped with the ring 15. A further shifting of the key 10 is therefore then not possible.

The front end of the key 10 has, in assembled position on being clamped by the ring 15 a distance a from the front end of the tie bolt 1. So that the front end of the key 10 in this position should not protrude beyond the circumference predetermined by the tie bolt 1, the key 10 has a blunt forward end the radial extent of which is about 1 mm. In this position of the key 10 its guide surface 13 does not lie flat on the key surface 8 of the tie bolt but has—as shown by FIG. 8—as a consequence of the difference between the angles $\alpha$ and $\beta$ a slight gap relative to the tie bolt 1. Only the front end of the key 10 applies linearly on the key surface 8 of the tie bolt 1.

Onto the external thread 3 of the threaded portion 2 a nut-like threaded bush 16 is screwed against the front side 17 of which facing the segment-shaped portion 4 there applies a tensioned helical compression spring 18 acting as a power store which applies by its other end against the projections 14 of the key 10. By means of this pressure spring 18 the key is held in the position represented in which it is at a slight distance from the stop face 9 of the tie bolt 1, so that in this position the tie bolt 1, the key 10 and the ring 15 acting as a catch are fixed in their relative position one to the other, as shown in FIG. 8. The tension of the compression spring 18 is achieved by the corresponding tightening of the threaded bush 16, i.e. the latter constitutes a tensionable abutment. The threaded bush 16 has an external shell 19 covering the compression spring 18, i.e. the front side 17 is designed embedded.

Figure 9:
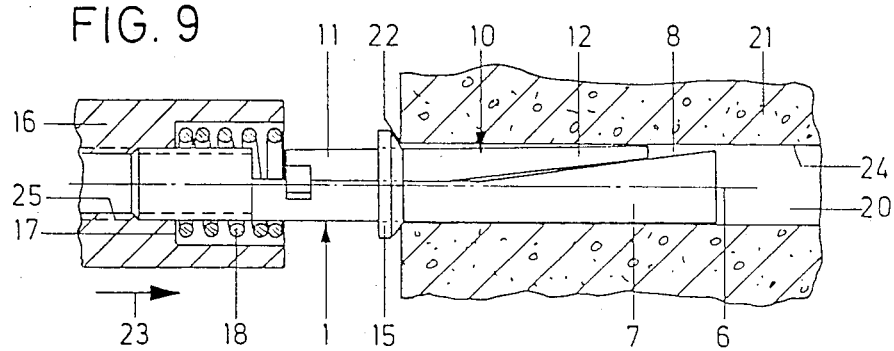
FIG. 9 is the representation of a fixing element partly inserted into a hole.
Figure 10:
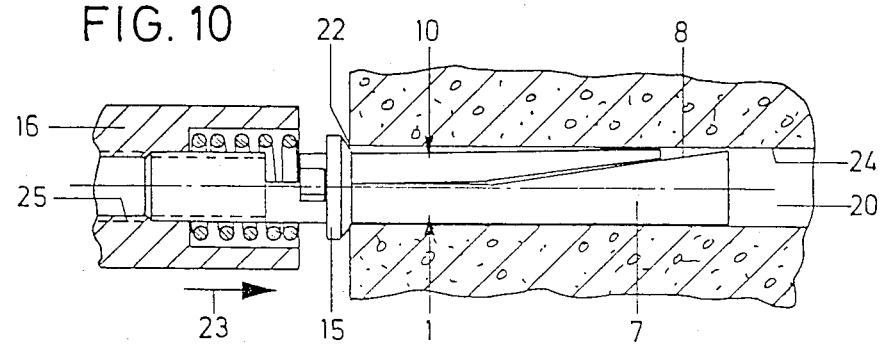
FIG. 10 shows the fixing element fully inserted into the hole.

The assembly of the above-described fixing element is effected as follows:

The fixing element, in pre-assembled condition according to FIG. 8, is pushed into a hole 20 in the solid base 21 which may be as a rule concrete or also hard brick. The diameter D' of the hole 20 is usually 0.2 to 0.4 mm greater than the diameter d of the tie bolt 1. The tie bolt 1 and the key 10 are freely inserted into the hole until the ring 15 comes to apply against the side of the hole 22. On the further insertion of the fixing element the ring 15 is shifted relative to the tie bolt 1 and correspondingly to the key 10 in the direction of the threaded portion 2. Here, for the reasons outlined above, the play between the ring 15 and the key 10 is rather greater, so that the key 10—even though very slightly—can be moved with its guide surface 13 on the key surface 8 of the tie bolt 1 by the pressure spring 18 additionally in the insertion direction 23. However, this shifting can be effected only until the front end of the key 10 comes in intensive contact with the hole wall 24. As on the insertion of the fixing element over the threaded bush 16 forces are exerted only on the tie bolt 1, forces oppositely directed from the hole wall 24 are correspondingly exerted on the key 10. As shown by FIGS. 9 and 10, the tie bolt 1 together with the key 10 can be pushed with the displacement of the ring 15 as far as the projections 14 of the key 10 into the hole 20, without the key 10 being moved appreciably in the insertion direction 23 against the tie bolt 1, although it is no longer clamped relative to the tie bolt 1 by the ring 15 acting as a catch.

If the tie bolt 1 together with the key 10—according to the representation in FIG. 10 completely or as far as the depth of the hole permits it—is pushed into the hole, then the key 10 can move into the insertion direction 23 under the action of the pressure spring 18, as a result of which there occurs simultaneously a spreading of the tie bolt 1 and the key 10 relative to each other. If now the tie bolt 1 is loaded in traction, i.e. oppositely to the insertion direction 23, then the tie bolt will only again be pulled slightly out of the hole, whereas the key 10, as a result of the force-loading by the pressure spring 18, and because of its friction on the hole wall 24, does not move relative to the hole 20, i.e. it moves relative to the tie bolt 1 in the insertion direction 23 substantially into the position shown in FIG. 11. In this position the fixing element is solidly anchored in the base 21. The extent of this relative movement, with predetermined measurements of the tie bolt 1 and key 10, substantially from the hole diameter D'.

Figure 11:
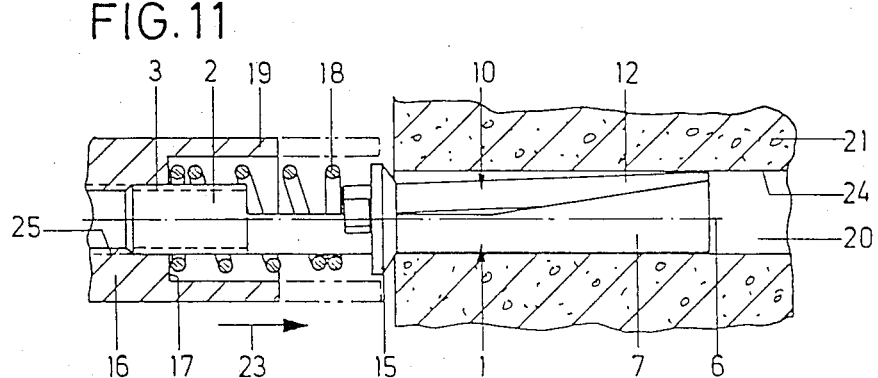
FIG. 11 shows the fixing element after the final keying in the hole.

If the key 10, particularly according to FIG. 11, is moved relative to the tie bolt 1 in the insertion direction 23, then its guide surface 13 comes to apply flat against the key surface 8 of the tie bolt 1, while the segment-shaped portion 11 of the key 10 no longer applies flat, but only linearly, onto the plane surface 5 of the tie bolt 1. In the area of the key portion 7 of the tie bolt 1 and of the wedge-shaped portion 12 of the key 10 there is therefore provided a flat application surface between tie bolt 1 and key 10, so that the radial pressure forces occurring on keying opposite the hole wall 24 can be absorbed particularly satisfactorily.

If required, the threaded bush 16 can now be screwed further on the threaded portion 2, as a result of which, firstly, the pressure spring 18 is again tensioned and. secondly, which is more important, the threaded bush 16 comes to the vicinity of the base 21, while, at the same time, the pressure spring 18 and the segment-shaped portion 4 protruding partly out of the wall, are covered.

The threaded bush 16 acts at the same time as a fixing element, i.e. parts to be fixed can be screwed into its outwardly open threaded hole 25.

A dismantling of the fixing element out of a hole 20 may be effected in relatively simple manner in that the the threaded bush 16 is unscrewed from the threaded portion 2, as a result of which the pressure spring 18 may at the same time be released and removed. With a suitable tool it is then possible to extract the key 10, as a result of which the clamping of the tie bolt 1 in the hole 20 is simultaneously removed.

Figure 12:
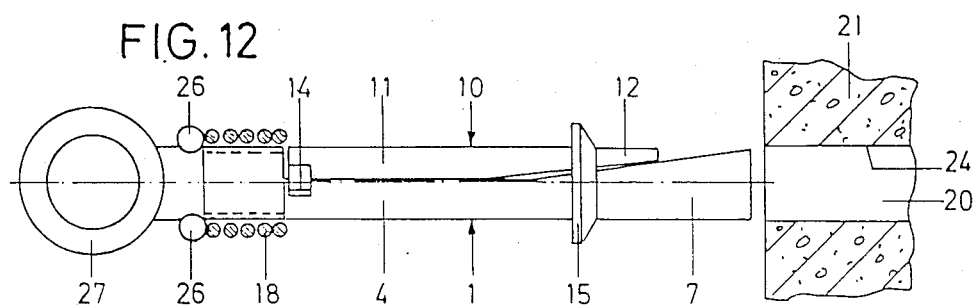
FIG. 12 shows a modified form of embodiment of the fixing element in a representation according to FIG. 8.

The embodiment according to FIG. 12 corresponds generally identically with the embodiment of FIG. 8 to FIG. 11. Only the abutment is constituted by two catch-shaped stops 26 swaged on the tie bolt 1. As with this design no threaded hole 25 is provided, an eye 27 is formed at the end of the tie bolt 1. This method of construction of a fixing element without optical covering of the pressure spring 18 is used, e.g. for hanging lamps, or the like.

What is claimed is:

1. A fixing element keyable in a hole (20) in a solid base (21), comprising
    a tie bolt (1) having one end adjacent to a key portion (7) insertable in said hole (20) and a second end placeable outside of said hole (20), a key (10) which is movably mounted on a key surface (8) of the tie bolt (1) slanting relative to a central longitudinal axis (6) of the tie bolt (1), said key surface (8) being part of the key portion (7),
    a power store means (18) supported against an abutment of the tie bolt (1) for exerting a pressure force onto the key (10) directed to the said one end to effect axial driving of the key (10) relative to the tie bolt (1), and
    a ring (15) holding the tie bolt (1) and the key (10) together, said ring having an inner diameter (D) slightly greater than a diameter (d) of the tie bolt (1);
    wherein the power (18) is initially biased against the key (10),
    wherein the ring (15) is inelastic and made of metal and constitutes locking means for holding said key (10) to prevent axial movement of said key (10) relative to said tie bolt (1) against the action of said power store means (18),
    wherein the ring when it is located in a first position in the region of said key surface (8) holds clamped against each other the tie bolt (1) and the key (10) under the pressure force of the power store (18),
    and wherein the ring (15) when it is located in a position between the said key surface (8) and the said second end holds the key (10) in a position movable relative to the tie bolt (1).

2. A fixing element according to claim 1, wherein the inner diameter (D) of the ring (15) is at most 0.1 mm greater than the diameter (d) of the tie bolt (1).

3. A fixing element according to claim 1, wherein the key surface (8) has an angle of slant (α) of 5° to 8° relative to the central longitudinal axis (6) of the tie bolt (1).

4. A fixing element according to claim 3, wherein the angle of slant (α) is about 5°.

5. A fixing element according to claim 1, wherein the abutment for the power store (18) is adjustable in the direction of the central longitudinal axis of the tie bolt (1).

6. A fixing element according to claim 5, wherein the abutment is formed by a threaded bush (16) disposed on a threaded portion (2) of the tie bolt (1).

7. A fixing element according to claim 5, wherein the abutment has an outer shell line (19) surrounding the power store (18).

8. A fixing element according to claim 1, wherein the abutment has an outwardly open threaded hole (25).

9. A fixing element keyable in a hole (20) in a solid base (21), comprising
    an elongated tie bolt (1) having a first end adjacent to a key portion (7) insertable into said hole (20), and a second end placeable outside of said hole (20),
    an elongated key (10) which is slidably mounted on a key surface (8) of said tie bolt (1) slanting relative to a central longitudinal axis (6) of said tie bolt (1), said key surface (8) being part of the key portion (7), said key (10) having a guide surface (13) slanting relative to said central longitudinal axis (6) and located adjacent a first end of said key (10) insertable into said hole (20), said key (10) having a second end placeable outside of said hole (20),
    power store means (18) supported against an abutment of said tie bolt (1) and biased against said second end of said key (10), and
    locking means for holding said key (10) against said tie bolt (1) to prevent axial movement of said key (10) relative to said tie bolt (1) against the action—in an initial position—of said power store means (18), said locking means comprising an inelastic metal ring (15) surrounding said tie bolt (1) and said key (10), said ring being slidable along said tie bolt (1) and said key (10) from said initial position to a second position whereupon said key (10) becomes axially slidable relative said tie bolt (1) and said power store means (18) drives said key (10) relative to said tie bolt (1).

* * * * *